United States Patent
Bay (10) Patent No.: US 10,254,093 B2
(45) Date of Patent: *Apr. 9, 2019

(54) COLOR CHANGING LIGHTED NOCK FOR ARROW SHAFTS

(71) Applicant: Clean-Shot Archery, Inc., Renton, WA (US)

(72) Inventor: Larry R. Bay, Renton, WA (US)

(73) Assignee: NOCKOUT OUTDOORS LLC, La Vernia, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/897,145

(22) Filed: Feb. 14, 2018

(65) Prior Publication Data

US 2018/0188010 A1 Jul. 5, 2018

Related U.S. Application Data

(63) Continuation of application No. 15/236,190, filed on Aug. 12, 2016, now Pat. No. 9,897,423.

(60) Provisional application No. 62/204,372, filed on Aug. 12, 2015.

(51) Int. Cl.
| | |
|---|---|
| *F42B 6/06* | (2006.01) |
| *F21V 33/00* | (2006.01) |
| *F21V 23/04* | (2006.01) |
| *H05B 33/08* | (2006.01) |
| *H05B 37/02* | (2006.01) |
| *F42B 12/38* | (2006.01) |
| *F21S 10/02* | (2006.01) |
| *F21Y 115/10* | (2016.01) |
| *F21Y 113/13* | (2016.01) |

(52) U.S. Cl.
CPC .............. *F42B 6/06* (2013.01); *F21S 10/023* (2013.01); *F21V 23/0442* (2013.01); *F21V 33/008* (2013.01); *F42B 12/382* (2013.01); *H05B 33/0857* (2013.01); *H05B 33/0872* (2013.01); *H05B 37/02* (2013.01); *F21Y 2113/13* (2016.08); *F21Y 2115/10* (2016.08)

(58) Field of Classification Search
CPC .......... F42B 6/04; F42B 6/06; H05B 33/0803; H05B 33/0857; H05B 37/02; H05B 39/04; H05B 41/36
See application file for complete search history.

(56) References Cited

U.S. PATENT DOCUMENTS

| | | |
|---|---|---|
| 5,546,266 A | 8/1996 | MacKenzie et al. |
| 6,123,631 A | 9/2000 | Ginder |
| 6,390,642 B1 | 5/2002 | Simonton |
| 7,316,625 B2 | 1/2008 | Takahashi |
| 7,927,240 B2 | 4/2011 | Lynch |
| 8,657,709 B2 | 2/2014 | Bay |
| 8,777,786 B1 | 7/2014 | Bay |
| 8,795,109 B2 | 8/2014 | Roman |
| 9,279,648 B2 | 3/2016 | Marshall, Jr. |

(Continued)

FOREIGN PATENT DOCUMENTS

CN 201636546 U 11/2010

*Primary Examiner* — John Ricci (57) ABSTRACT

An archery nock includes a nock assembly and a light source disposed within the nock assembly. The light source includes a first color element and a second color element. The second color element is a different color than the first color element. The light source is configured to flash the first and second color elements on and off.

20 Claims, 5 Drawing Sheets

(56) References Cited

U.S. PATENT DOCUMENTS

| | | | |
|---|---|---|---|
| 9,454,912 B2 | 9/2016 | Van Wagoner et al. | |
| 9,897,423 B2 * | 2/2018 | Bay | F42B 6/06 |
| 2008/0287229 A1 | 11/2008 | Donahoe | |
| 2009/0166233 A1 | 7/2009 | Torrisi | |
| 2011/0309769 A1 | 12/2011 | Kuroki et al. | |
| 2014/0103810 A1 | 4/2014 | Shaffer, II et al. | |
| 2016/0088697 A1 | 3/2016 | Yan et al. | |

* cited by examiner

COLOR CHANGING LIGHTED NOCK FOR ARROW SHAFTS

PRIORITY

This application is a continuation of U.S. patent application Ser. No. 15/236,190, filed on Aug. 12, 2016, which claims the priority benefit of U.S. Provisional Application No. 62/204,372, filed on Aug. 12, 2015, and both of which are hereby incorporated herein by reference in their entirety.

FIELD

The present invention relates to arrow systems, and more particularly, to a lighted nock that can be caused to change colors in response to an applied magnetic field.

BACKGROUND

The use of lighted nocks for archery is known. Lighted nocks are beneficial because they allow the archer to track the flight of the arrow to their intended target, particularly in low-light conditions. Lighted nocks are typically lighted with a light emitting diode (LED) powered by a small battery, typically lithium-type, disposed within the nock assembly. The nock is either clear or translucent so that the LED light source can light up the nock when the battery power is applied.

However conventional lighted nocks are only one single color, which must be chosen by the user at the time of purchase. The color of the lighted nock either cannot be changed, or the battery/LED component must be removed from the assembly and replaced with a different battery/LED assembly having a different color. Either way, the user desiring to change their LED color must swap out one or more components to make the color change, thus making color changes inconvenient and expensive. Some LED colors are more visible than others based on various levels and types of color blindness or based upon the personal preference of the archer. Moreover, the available array of colors to a given purchaser is limited because each separate color of nock assembly of subcomponent must be merchandised, which takes up limited display space in a store. Packaging multiple separately colored lighted nocks in one single package would be cost prohibitive and undesirable as archers like to shoot a consistent color of lighted nock to tell their arrow apart from others. Therefore, there is a need to provide an improved lighted nock system that permits the user to change the color of the LED without needing to alter or replace their nock components.

SUMMARY

The disclosure includes a nock assembly configured to allow for the sequential switching between multiple different emitted colors of the light by exposing the nock to a magnetic field. The nock is placed in the on or lit state. Then a magnet is brought within range of a magnetic sensor that is in the electronic circuit of the nock assembly. The change in the magnetic field causes the circuit to advance the emitted LED light to the next color in a sequence of multiple colors. Repeated removal and re-application of the magnetic field while the LED remains lit advances or steps the LED color repeatedly through the available colors until the user reaches their desired color. Then the LED is deactivated or turned off. Now when the LED is re-lit, it will still be in the last color chosen, and will remain there until the color is advanced again by exposure to the magnetic field when in the lit state.

The disclosure also includes a color changing lighted nock for arrow shafts. The nock comprises a nock assembly and an electronic circuit disposed within the nock assembly. The electronic circuit comprises a red/green/blue (RGB) light emitting diode (LED), a first flip-flop coupled to the RGB LED, and a magnetic sensor coupled to the first flip-flop. A second flip-flop can be coupled to the RGB LED and to the first flip-flop.

A plurality of transistors can be electrically disposed between the first flip-flop and the RGB LED. In one example, a first transistor electrically is disposed between the first flip-flop and the RGB LED, a second transistor is electrically disposed between the first flip-flop and the RGB LED, and a third transistor is electrically disposed between the second flip-flop and the RGB LED.

The electronic circuit can be configured to sequentially advance to a next one of a plurality of different colors upon the application of a magnetic field to the magnetic sensor.

The disclosure further includes a color changing lighted nock kit for arrow shafts. The kit comprises a plastic shell and a color changing lighted nock according to claim 1 disposed within the plastic shell. The color changing lighted nock includes a shaft insertion portion having a first diameter dimension. A first adaptor is also disposed in the plastic shell. The first adaptor includes an internal opening having an internal diameter conforming to the first diameter dimension of the shaft insertion portion of the color changing lighted nock, and the first adaptor having a first adaptor outside diameter larger than the first end outside diameter dimension of the shaft insertion portion of the color changing lighted nock. A second adaptor is further disposed in the plastic shell. The second adaptor includes an internal opening having an internal diameter conforming to the first diameter dimension of the shaft insertion portion of the color changing lighted nock, and the second adaptor having a second adaptor outside diameter larger than the first adaptor outside diameter.

The color changing lighted nock of the kit can include a nock body comprising an index structure that prevents relative rotation of the nock body with respect to the arrow shaft while allowing the nock body to move towards the arrow shaft along a longitudinal axis of the arrow shaft to illuminate the RGB LED.

The disclosure additionally includes a method of changing color of a sporting equipment. The method includes activating an LED assembly disposed within the sporting equipment, applying a magnetic field to a magnetic sensor coupled to the LED assembly, and sequentially advancing to a next one of a plurality of different colors upon the application of a magnetic field to the magnetic sensor.

The disclosure also includes an electronic circuit for changing color of an LED assembly. The electronic circuit includes an LED, a first flip-flop coupled to the LED, a magnetic sensor coupled to the first flip-flop, and a second flip-flop coupled to the first flip-flop and to the LED.

The present color changing features can be provided to a wide variety of sporting equipment where lighting is desirable, including fishing equipment such as bobbers and lures, golf balls, Frisbees, archery equipment such as nocks, among others.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention. It is understood that the various features and aspects discussed herein may be used in any combination, or in isolation, without departing from the scope of the present invention.

The present invention can be configured as a lighted nock such as that disclosed in U.S. Pat. No. 8,777,786, entitled "LIGHTED NOCK" which is hereby incorporated herein by reference in its entirety.

Figure 1:
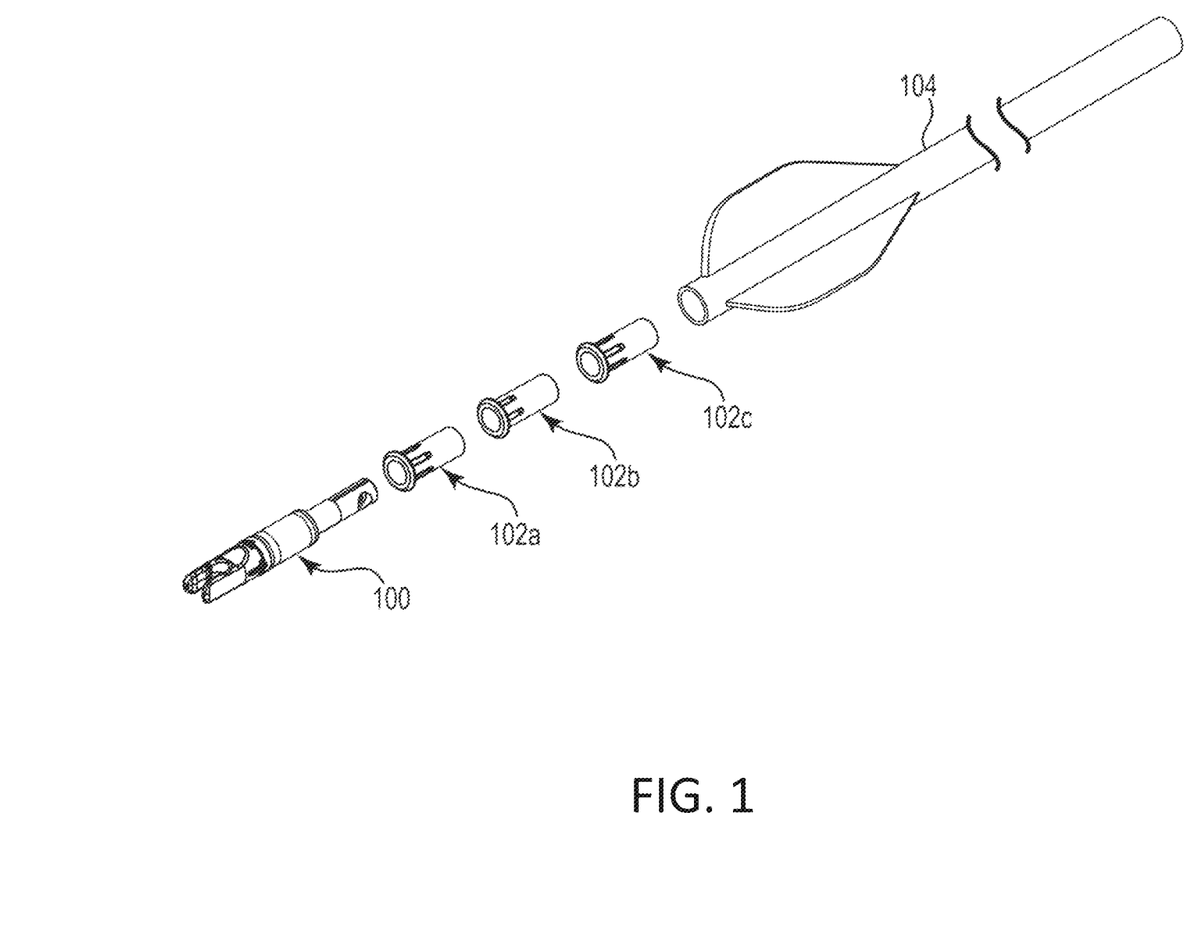
FIG. 1 is an exploded perspective view of a color changing lighted nock system for an arrow shaft according to certain example embodiments.

Referring to FIG. 1, a color changing lighted nock assembly 100 is shown in axial alignment with three different size nock sleeves or nock adaptors 102a, 102b and 102c. Each adaptor has a different outside diameter (OD) corresponding to certain common inside diameters (ID) of arrow shafts 104. For example, adaptor 102a for 0.204 inch shaft ID, adaptor 102b for 0.233 inch shaft ID and adaptor 102c for 0.244 inch shaft ID are all shown. Other adaptor sizes can be provided without departing from the scope of the invention.

The inside diameter of each of the nock adaptors 102a, 102b and 102c is the same so that a single lighted nock assembly 100 can be used universally with all of the different OD size adapters. In one example, the inside diameter of the adaptors is 0.165 inches. In this example, the outside diameter of the portion of the nock assembly 100 that is inserted into the adaptor is sized to fit 0.165 inch ID arrow shafts. Thus, the nock assembly 100 would be used without an adapter for 0.165 inch ID arrow shafts, and with a respective adaptor 102a, 102b and 102c for 0.204, 0.233 and 0.244 inch shaft IDs. Currently 0.165 inch shaft IDs are the smallest widely used by hunters, but the present invention can be adapted to smaller shafts and used with a wider variety of adaptors without departing from the scope of the invention.

The feature of using one standard nock size with a variety of adaptors to fit with a variety of different arrow ID shafts reduces the need for manufacturing more than one size lighted nock. The feature of the ability to change the color of the lighted nock reduces the need to manufacture nocks (or nock components) in multiple different colors. Each of the foregoing fitment and color changing features alone eliminates the need for the store to maintain inventory and merchandise more than one lighted nock size and color. Combining both color and fitment features provides for the greatest reduction in merchandising and inventory needs.

The color changing feature allows the user to choose the color of lighted nock that they prefer from the available color palate. Thus, the user can differentiate their nock color from other archers in their group, or choose a color that provides the best visibility in the current conditions, or just to pick a favorite color.

The fitment feature provides the additional benefit that a user cannot accidentally purchase the wrong size of lighted nock for their particular shaft ID. Furthermore, the user now has the ability to use the same lighted nock for multiple arrow shaft ID sizes that they may use for targets or hunting by simply moving the lighted nock from one shaft to another with the use of the adaptors that are all provided in the original package (kit).

Figure 2:
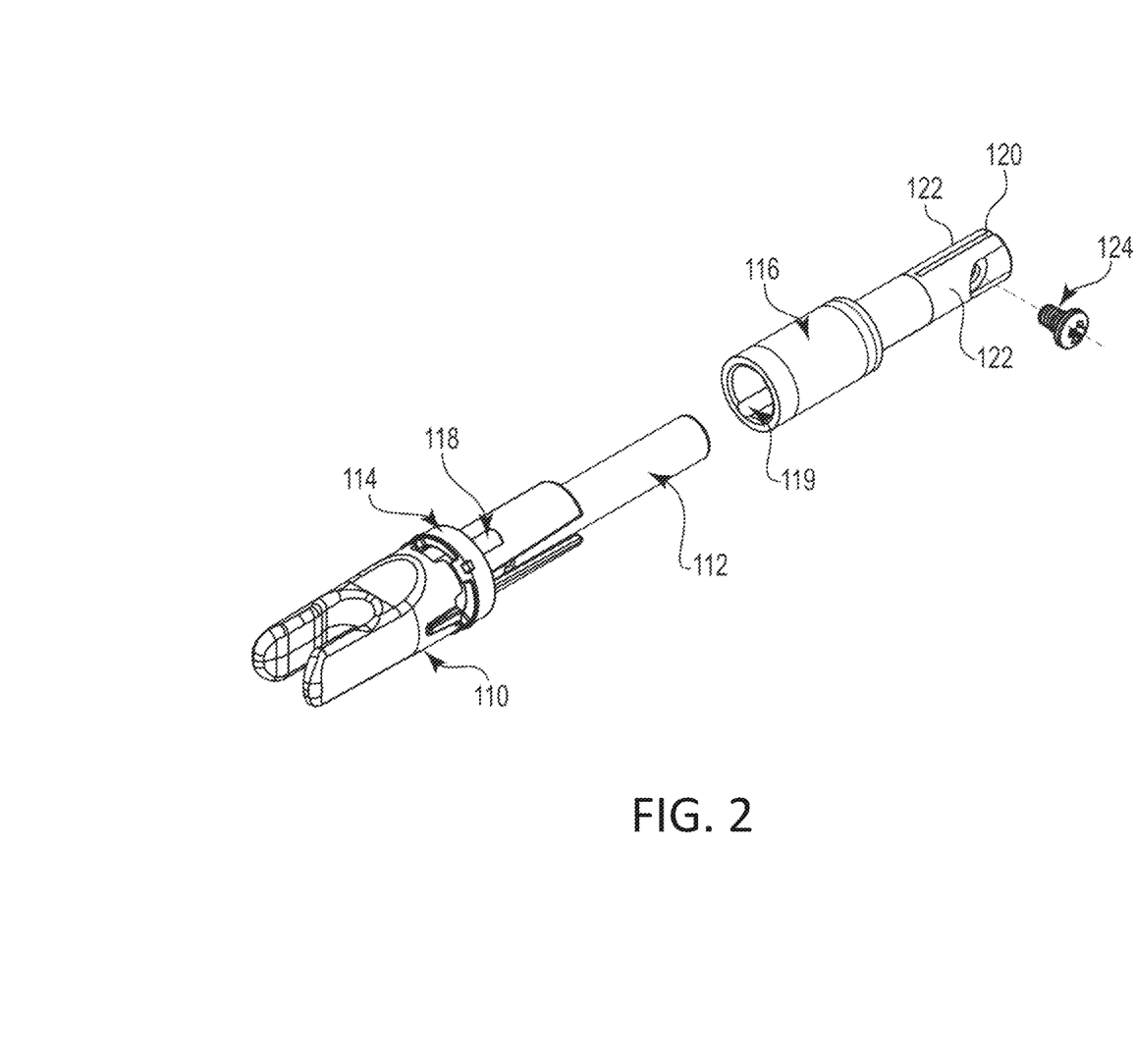
FIG. 2 is an assembly perspective view of a color changing lighted nock system for arrow shafts according to certain example embodiments.

A single "universal fit" and/or "universal color" package or kit 106 can be provided, as shown in FIG. 2, that contains one or more color changing lighted nock assemblies 100 and a variety of nock adaptors 102a, 102b and 102c, each in a plurality of sizes. In a preferred embodiment, there is the same number of nock adaptors as the number of color changing lighted nock assemblies 100. More or fewer numbers of color changing lighted nock assemblies and nock adaptors can be provided in a single package without departing from the scope of the invention. Additionally, an instruction sheet can be disposed in the package or the instructions can be incorporated into the packaging itself.

The packaging comprises a full or partial plastic shell 108 including joined front and back panels in a preferred embodiment. An aperture 109 can be defined adjacent the top edge to allow for hanging by a post in the store display.

Figure 3:
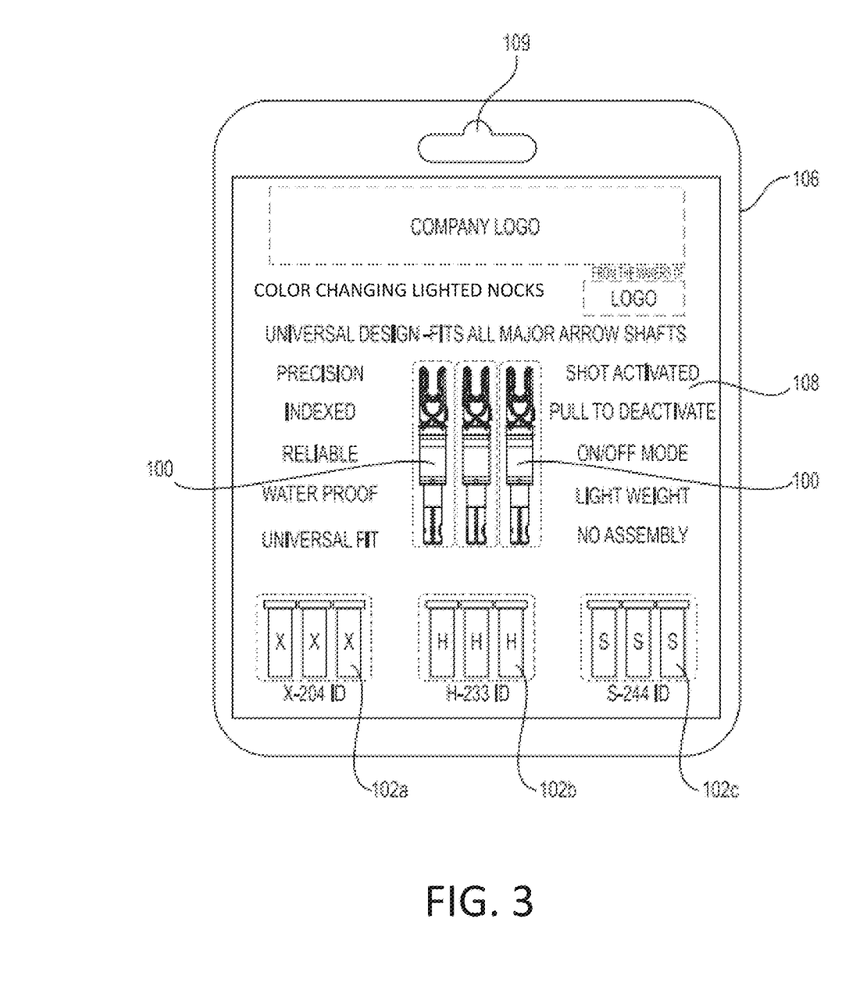
FIG. 3 is a front view of a packaged color changing lighted nock system kit for arrow shafts according to certain example embodiments.

Referring now to FIG. 3, the color changing lighted nock system or device 100 components are shown. The nock assembly comprises a nock body 110, an LED assembly 112, a nock activation collar 114 disposed around the outside diameter of the first end of the nock body 110, and a nock housing portion 116. The LED end of the LED assembly 112 is secured to the nock body 110. The second end of the nock body 110 defines a channel portion configured to receive the string of the bow. The housing portion 116 includes a first end configured for insertion into the inside diameter of the arrow shaft and a second end that defines an aperture for receiving the first end of the nock body 110. Raised male index tabs 118 adjacent the first end of the nock body are configured to engage respective recessed female index slots 119 defined in the second end of the housing 116.

The color changing lighted nock system is assembled by securing the LED end of the LED assembly 112 to the nock body 110 via the first end of the nock body. In one embodiment, ultraviolet curable glue is used to accomplish the securing. Other securing methods and means can also be employed. For example, heat staking or ultrasonically welding the nock body to the LED end of the LED assembly can be used. A mechanical pin or "C" clip can also be driven through the nock body and the LED end of the LED assembly to join the two components in other alternatives.

In certain embodiments, the activation collar 114 is slid over the first end of the nock body 110 with the teeth facing away from the first end. The activation collar is installed with the LED in the "Off" or deactivated position to set an activation gap for the lighted nock 100. Then the nock body assembly is mated with the nock housing 116 by inserting the first end of the nock body into the receiving end (second end) of the housing 116 until the components are fit together.

The housing portion of the LED assembly 112 is then secured to the nock housing 116. In the illustrated embodiment, the distal end of the battery housing portion is secured via a battery retention screw 124 that tightens the two halves 122 of the first end together to close the gap 120, which grips the LED housing portion of the LED assembly 112 securely. Alternatively, the housing portion can be glued in place or attached in a similar manner to the LED end as discussed previously. In the glued embodiment, the first end of the housing 116 need not be configured to form the gap 120. A simple bore can be provided with the necessary clearance for the housing portion distal end.

The color changing lighted nock assembly 100 is rotationally indexable with respect to the arrow shaft in which it is inserted. The index position will not be lost by operation of the lighted nock assembly (e.g. opening and closing of the activation gap). Index structures such as raised male index tabs 118 of the nock body 110 engage corresponding recessed female index slots 119 defined in the housing 116 when the two components are secured together. This configuration prevents rotation of the nock body 110 with respect to the nock housing 116, while permitting these respective components to still move longitudinally with respect to one another.

The LED assembly 112 comprises an elongated body with an LED disposed on one end and a housing extending opposite of the LED to define the other end. An activation gap is defined at the juncture of the LED and housing so that the LED can be activated by closing the gap (i.e. moving the LED towards the housing) and deactivated by opening the gap (i.e. moving the LED away from the housing).

The housing portion of the LED assembly includes the power source for the LED as well as the electronics for controlling the color of the LED. The color changing electronics can be either integrated as a single circuit component, or the electronics can be separately disposed on a substrate and electronically coupled to one another to provide the specified functionality.

The battery is preferably a lithium type battery due to the size/capacity advantages of such type. However, other battery types can be used (including multiple batteries in series or parallel) without departing from the scope of the invention.

The LED assembly can alternatively be disposed inside of the arrow shaft, but be external to the nock components. In such embodiment, the LED assembly is arranged so that the light from the LED is transferred through the nock body so that the nock is illuminated. The LED assembly can be located adjacent the nock or anywhere along the length of the arrow shaft, including at the opposing front end of the arrow shaft where the arrow head is located. The LED assembly can even be located within the arrow head with the light projected rearward through the arrow shaft to illuminate the nock end.

Figure 4:
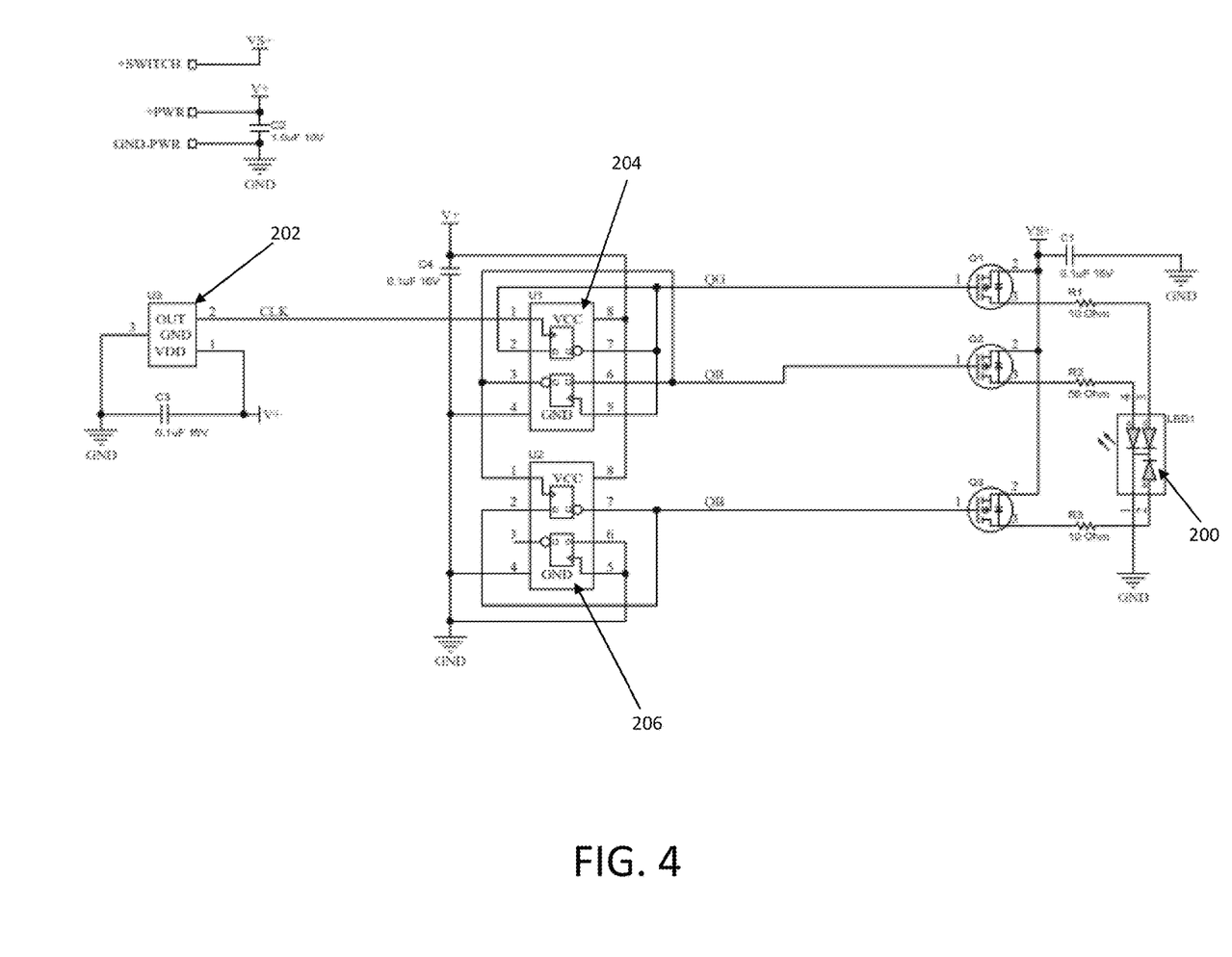
FIG. 4 is an electrical circuit schematic according to certain example embodiments.

Referring to FIG. 4, an electrical circuit schematic for enabling the color changing feature is shown. The LED 200 is a common cathode red/green/blue (RGB) surface mount (SMT) LED. The RGB LED 200 is able to produce virtually any color or hue of light by selectively powering the inputs to the component. It should be noted that the circuit can also be re-configured to utilize a common anode RGB LED or other types of variable color LED components without departing from the scope of the invention.

In the indicated embodiment, the capacitors C1, C3 and C4 each are 0.1 uF 16V capacitors. Capacitor C2 is a 1.0 uF 10V capacitor. Control transistors Q1, Q2 and Q3 are –20V, 200 mA, P-channel Mosfets. Resistors R1 and R3 are each 10 Ohm resistors. Resistor R2 is a 56 Ohm resistor.

The magnetic sensor (Hall sensor U3) 202 is a hall sensor. For example, the hall sensor used in the embodiment shown in the FIG. 4 is a dual polarity, 1.6 to 3.5V, CMOS out, SOT23 hall sensor. The magnetic sensor 202 senses application of a magnetic field that is greater than a pre-set threshold.

Components U1 and U2 are each dual positive-edge-triggered D-Type flip-flops. The flip-flops (U1 and U2), 204 and 206 respectively, function as memory cells that allow the circuit to "count" through the sequence of colors of the LED by advancing the clock setting in each flip-flop with each occurrence of triggering the hall sensor 202 by a magnetic field. The outputs of the flip-flops 204, 206 (U1 and U2) are coupled to the transistors Q1, Q2 and Q3 as indicated in FIG. 4, which allows for the LED colors to be changed in a pre-ordered sequence of colors. In one embodiment there are seven colors in the order of: green, red, yellow, blue, teal, pink, and white. Of course, more or fewer numbers of colors can be provided, as well as the colors themselves and their order can be varied, without departing from the scope of the invention.

In another example embodiment, one of the color positions, such as white, can be swapped for an LED "off" setting. Thus, the LED will be set to be non-illuminated regardless of whether the activation gap is closed. This embodiment provides the user the ability to shoot their arrow without the LED becoming illuminated while avoiding the need to provide a mechanical means (e.g. a lockout collar) for preventing the LED from illuminating.

In a further example embodiment, the color changing circuit can be configured to put the LED into a flashing mode as one of the sequence of LED output modes.

The electronic circuit disclosed herein for changing the LED colors advantageously does not require a microprocessor to control the color sequencing of the LED. This allows the circuit to be made smaller and less costly as compared to a circuit that includes a microprocessor. However, in certain embodiments, a control circuit that includes a microprocessor programmed to sequence the colors of the LED can be provided without departing from the scope of the invention.

Figure 5:
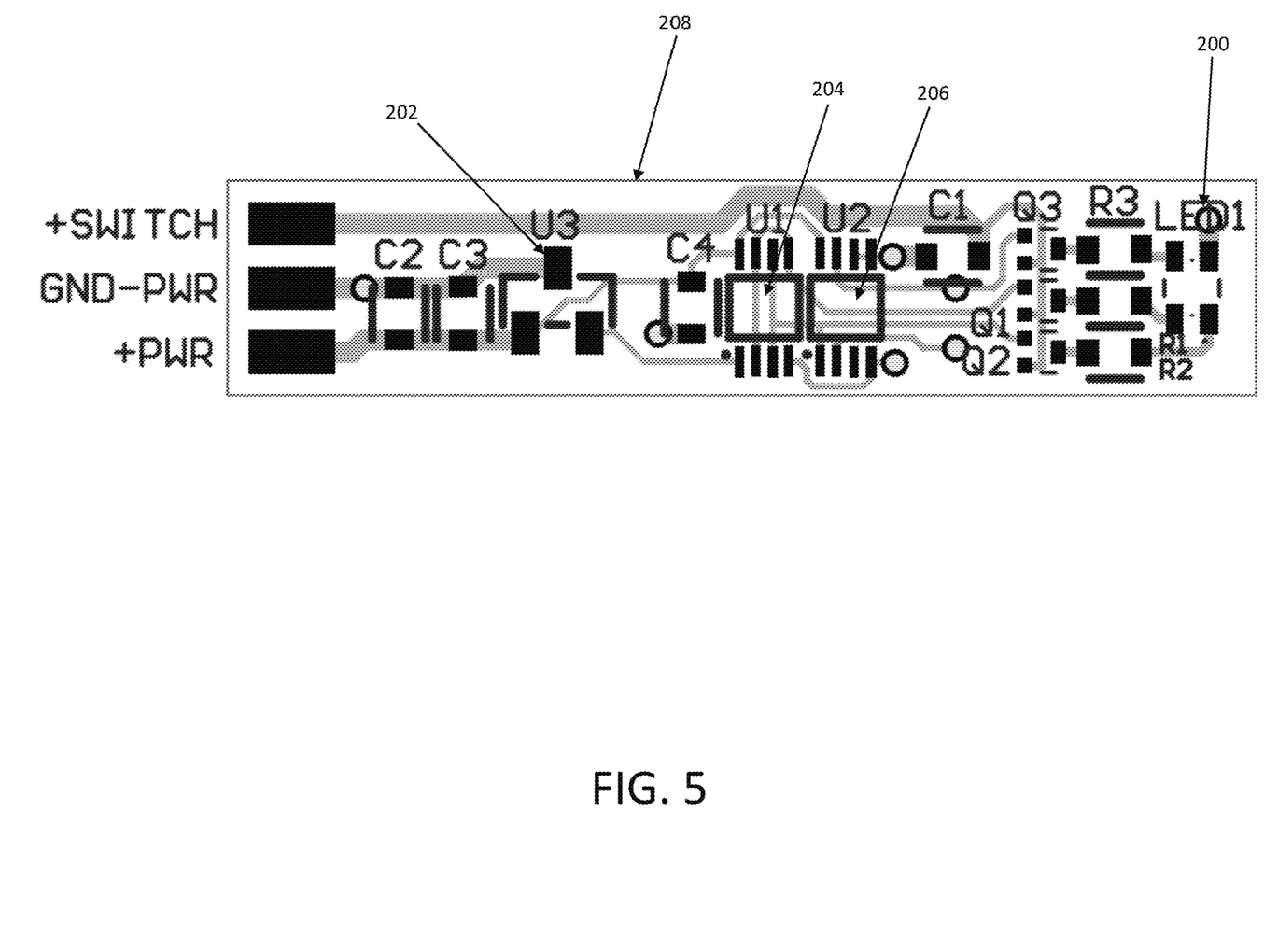
FIG. 5 is a discreet circuit diagram showing a layout of the circuit components of FIG. 1 on a board according to certain example embodiments.

FIG. 5 shows the circuit components of FIG. 4 disposed on a circuit board 208 in one embodiment of a board layout. However, other layouts and configurations can be provided without departing from the scope of the invention.

Some or all of the various color changing circuit components described herein can also be configured as a custom integrated circuit component. This would allow the electronics to be physically much smaller than the discrete circuit of FIG. 4, which is made from independent electronic components.

The magnet used to generate the magnetic field to advance the color can be any ordinary magnet with a magnetic field sufficient to trigger the hall sensor.

The hall sensor 202 can be replaced with a different type of sensor in alternative embodiments. For example, an accelerometer or impact sensor component can be provided, which will react to a force applied to the arrow nock. In such example, the colors can be advanced by tapping the nock body with the user's hand or by contacting the nock body against a surface. However, the force is preferably selected such that the color is not advanced when the arrow is shot from a bow or when contacting a target.

The present invention can be combined into a kit (assembled or unassembled) including one or more arrow shafts or arrow heads. The present invention can also be configured as a retrofit LED assembly that will fit in the same space as a single-color LED assembly in conventional equipment.

Two or more colors can be provided, but preferably more than two different colors are selectable, and significantly more than three colors can be provided (e.g. six or twelve or more) according to certain embodiments.

In use, according to one example embodiment, the nock assembly 100 is placed in the activated, LED "on" or lit state by moving the nock body 110 towards the housing 116 (preferably in a linear longitudinal manner). Then the user brings a magnet within range of the magnetic sensor 202 (U3). The sensor 202 causes the electronic components in the circuit to advance, clock, step or toggle to the next LED color in the possible sequence of colors enabled by the circuit. The magnet is then removed from the proximity of the magnetic sensor 202.

The next available color can be selected by again bringing the magnet within close enough proximity to the magnetic sensor 202 to trigger the sensor, thereby causing the circuit to advance to the next color.

Repeated application and withdrawal of the magnet as described above will cause the circuit to eventually advance through all of the available colors. At that point, the next advancing action will be back to the first color in the available sequence of colors.

Once the LED is emitting the color or hue from the available colors that the user chooses, the LED is turned off by pulling or moving the nock body 110 away from the housing 116 (again preferably in a linearly longitudinal manner). In the "off" or deactivated (unlit) state, the hall sensor is not triggered by the presence of a magnetic field, so the color will not accidentally advance to another setting.

When the LED is activated or turned on again, it will be the same color it was when it was turned off. Thus, the color setting is maintained until the user changes it in the manner described herein.

It is a feature and advantage of certain embodiments to provide an on/off mechanism separate from the color advancing mechanism. Doing this permits the same color to be maintained regardless of the number of on/off cycles of the LED.

The color changing features need not be limited to arrow nocks. The invention can be applied to other sporting equipment where internal lighting is desirable. For example, the LED, battery and associated circuitry can be disposed within fishing equipment such as bobbers and lures, inside of golf balls, secured to Frisbees, among others.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. An archery nock, comprising:
    a nock assembly; and
    a light source disposed within the nock assembly, the light source comprising a first color element and a second color element, the second color element being a different color than the first color element, the light source configured to flash the first and second color elements on and off.

2. The archery nock of claim 1, wherein the first color element is a red color element and the second color element is a green color element.

3. The archery nock of claim 1, wherein the light source comprises a light emitting diode (LED).

4. The archery nock of claim 1, wherein the light source comprises a red/green/blue (RGB) LED.

5. The archery nock of claim 1, wherein the light source is configured to sequentially advance to a next one of a plurality of different colors upon the application of a magnetic field to the nock assembly.

6. The archery nock of claim 1, wherein the nock assembly comprises a nock end slidably disposed partially within a nock housing; and wherein an activation gap is defined between the nock end and the nock housing, the light source being powered on when the activation gap is closed and powered off when the activation gap is open.

7. A method of illuminating an archery nock assembly, the method comprising:
    providing a light source comprising a first color element and a second color element, wherein the first color element and the second color element are different colors; and
    flashing each of the first and second color elements.

8. The method of claim 7, further comprising sequentially advancing a color of the light source to a next one of a plurality of different colors upon the application of a magnetic field to the nock assembly.

9. The method of claim 7, further comprising powering the light source on by closing an activation gap defined between a nock end and a nock housing of the nock assembly; and powering the light source off by opening the activation gap.

10. The method of claim 7, wherein the first color element is a red color element and the second color element is a green color element.

11. The method of claim 7, wherein the light source comprises an RGB LED.

12. The method of claim 7, wherein the light source comprises an LED.

13. An archery nock system, comprising:
    a nock assembly; and
    a light source disposed within the nock assembly, the light source comprising a plurality of differently-colored color elements, the light source configured to sequentially advance to a next one of a plurality of different color settings upon the application of a magnetic field to the nock assembly.

14. The archery nock system of claim 13, wherein the plurality of differently-colored color elements includes red and green color elements.

15. The archery nock system of claim 13, wherein the light source comprises an RGB LED.

16. The archery nock system of claim 13, wherein the light source comprises an LED.

17. The archery nock system of claim 13, wherein the light source comprises a flip-flop circuit component.

18. The archery nock system of claim 13, wherein the nock assembly comprises a nock end slidably disposed partially within a nock housing; and wherein the nock end and nock housing each include complimentary indexing features to prevent relative rotation of the nock end with respect to the housing as the nock end slides longitudinally within the nock housing.

19. The archery nock system of claim 13, wherein one of the plurality of different color settings is an LED off setting.

20. The archery nock system of claim 13, wherein the nock assembly comprises a nock end slidably disposed partially within a nock housing; and wherein an activation gap is defined between the nock end and the nock housing, the light source being powered on when the activation gap is closed and powered off when the activation gap is open.

* * * * *